United States Patent
Larson (10) Patent No.: US 9,513,953 B2
(45) Date of Patent: *Dec. 6, 2016

(54) REDUCING VIRTUAL MACHINE SUSPENSION TIME IN CHECKPOINT SYSTEM

(71) Applicant: International Business Machines Corporation, Armonk, NY (US)

(72) Inventor: David A. Larson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/047,045

(22) Filed: Feb. 18, 2016

(65) Prior Publication Data

US 2016/0162325 A1    Jun. 9, 2016

Related U.S. Application Data

(63) Continuation of application No. 14/026,533, filed on Sep. 13, 2013, now Pat. No. 9,323,553.

(51) Int. Cl.
```
G06F 9/46      (2006.01)
G06F 9/455     (2006.01)
G06F 13/26     (2006.01)
G06F 9/50      (2006.01)
```
(52) U.S. Cl.
CPC ....... *G06F 9/45558* (2013.01); *G06F 9/45533* (2013.01); *G06F 9/5077* (2013.01); *G06F 13/26* (2013.01); *G06F 2009/45562* (2013.01); *G06F 2009/45575* (2013.01); *G06F 2009/45591* (2013.01)

(58) Field of Classification Search
None
See application file for complete search history.

(56) References Cited

U.S. PATENT DOCUMENTS

| | | |
|---|---|---|
| 5,778,388 A | 7/1998 | Kawamura et al. |
| 6,622,263 B1 | 9/2003 | Stiffler et al. |
| 7,188,060 B1 | 3/2007 | Adcock |
| 7,840,768 B2 | 11/2010 | Stiffler et al. |
| 8,285,869 B1 | 10/2012 | Graetz |
| 8,375,188 B1 | 2/2013 | Shah et al. |
| 8,812,907 B1 | 8/2014 | Bissett et al. |
| 2006/0179207 A1 | 8/2006 | Eisen et al. |
| 2007/0112889 A1 | 5/2007 | Cook et al. |
| 2010/0023944 A1 | 1/2010 | Browne et al. |

(Continued)

OTHER PUBLICATIONS

Bailey et al., "IBM PowerVM Live Partition Mobility", IBM RedBooks, International Technical Support Organization, Mar. 2009, Second Edition, 310 pages, © Copyright International Business Machines Corporation 2007, 2009.

(Continued)

*Primary Examiner* — Eric C Wai
*Assistant Examiner* — James J Lee
(74) *Attorney, Agent, or Firm* — Robert J. Shatto; Grant Johnson (57) ABSTRACT

Performing a checkpoint includes determining a checkpoint boundary of the checkpoint for a virtual machine, wherein the virtual machine has a first virtual processor, determining a scheduled hypervisor interrupt for the first virtual processor, and adjusting, by operation of one or more computer processors, the scheduled hypervisor interrupt to before or substantially at the checkpoint boundary.

14 Claims, 9 Drawing Sheets

(56) References Cited

U.S. PATENT DOCUMENTS

| | | |
|---|---|---|
| 2010/0037096 A1 | 2/2010 | Bum et al. |
| 2010/0107158 A1 | 4/2010 | Chen et al. |
| 2011/0167195 A1 | 7/2011 | Scales et al. |
| 2011/0167196 A1 | 7/2011 | Scales et al. |
| 2011/0208908 A1 | 8/2011 | Chou et al. |
| 2011/0289345 A1 | 11/2011 | Agesen et al. |
| 2012/0084520 A1 | 4/2012 | Chou et al. |
| 2012/0191908 A1 | 7/2012 | North et al. |
| 2013/0067277 A1 | 3/2013 | Mummidi |
| 2013/0097120 A1 | 4/2013 | Mummidi |
| 2013/0254459 A1 | 9/2013 | Laplace et al. |
| 2013/0332660 A1 | 12/2013 | Talagala et al. |
| 2014/0095821 A1 | 4/2014 | Yang et al. |
| 2014/0164722 A1 | 6/2014 | Garthwaite et al. |
| 2014/0164723 A1 | 6/2014 | Garthwaite et al. |
| 2015/0081943 A1 | 3/2015 | Larson |
| 2015/0082087 A1 | 3/2015 | Jacobs et al. |
| 2015/0149999 A1 | 5/2015 | Ramanathan et al. |
| 2015/0309883 A1 | 10/2015 | North |
| 2016/0019075 A1 | 1/2016 | Larson |

OTHER PUBLICATIONS

Bowen et al., "Virtual Checkpoints: Architecture and Performance", IEEE Transactions on Computers, vol. 41, Issue 5, pp. 516-525, May 1992, (Manuscript received Jun. 24, 1991, Revised Dec. 4, 1991), © 1992 IEEE DOI: 10.1109/12.142677.

Cabillic et al., "The Performance of Consistent Checkpointing in Distributed Shared Memory Systems", Proceedings: 14th Symposium on Reliable Distributed Systems, 1995, pp. 96-105, © 1995 IEEE DOI: 10.1109/RELDIS.1995.526217.

Elnozahy et al., "The Performance of Consistent Checkpointing", Proceedings: 11th Symposium on Reliable Distributed Systems, 1992, pp. 39-47, © 1992 IEEE. DOI: 10.11091RELDIS.1992. 235144.

Elnozahy et al., "A Survey of Rollback-Recovery Protocols in Message-Passing Systems", ACM Computing Surveys (CSUR), vol. 34, Issue 3, Sep. 2002, pp. 375-408, ACM New York, NY. DOI: 10.1145/568522.56825.

Gerofi et al., "Workload Adaptive Checkpoint Scheduling of Virtual Machine Replication", 2011 IEEE 17th Pacific Rim International Symposium on Dependable Computing (PRDC), 2011, 10 pages. DOI: 10.1109/PRDC2011.32.

IBM, "z/VM Single System Image Overview", printed: Feb. 20, 2013, 3 pages, © 2013 IBM Corporation. vm.ibm.com/ssi.

Kingsley et al., "Compiler-Assisted Checkpoint Optimization Using SUIF", Paper Submitted to First SUIF Compiler Workshop, Nov. 15, 1995, pp. 1-16. DOI: 10.1.1.31.1300.

Li et al., "Real-Time, Concurrent Checkpoint for Parallel Programs", PPOPP '90: Proceedings of the second ACM SIGPLAN symposium on principles & practice of parallel programming, Feb. 1990, pp. 79-88, ACM New York, NY © 1990. DOI: 10.1145/99163.99173.

Plank et al, "Libckpt: Transparent Checkpointing Under Unix", TCON '95: Proceedings of the USENIX Winter 1995 Technical Conference Proceedings, Jan. 1995, 14 pages.

Plank et al., "Diskless Checkpointing", Technical Report UT-CS-97-380, University of Tennessee, Dec. 17, 1997, pp. 1-30.

Red Hat, "Virtualization Administration Guide, Chapter 4: KVM live migration", Red Hat Customer Portal, © 2012 Red Hat, Inc., 7 pages. //access.redhat.com/knowledge/docs/en-US/Red_Hat_Enterprise_Linux/6/html/Virtualization_Administration_Guide/.

Wilson et al., "Demonic Memory for Process Histories", PLDI '89: Proceedings of the ACM SIGPLAN 1989 conference on Programming language design and implementation, Jul. 1989, pp. 330-343, ACM New York, NY © 1989. DOI: 10.1145/73141.74898.

Jacobs et al., "Checkpoint Capture and Tracking in a High Availability System," U.S. Appl. No. 14/027,795, Filed Sep. 16, 2013, IBM Docket No. ROC920130048US1.

Jacobs et al., "Checkpoint Capture and Tracking in a High Availability System," U.S. Appl. No. 14/065,513, =fled Oct. 29, 2013, IBM Docket No. ROC920130048US2.

Jacobs, et al., "Failover Detection and Treatment in Checkpoint Systems," U.S. Appl. No. 14/043,244, Filed Oct. 1, 2013, IBM Docket No. ROC920130049US1.

Jacobs, et al., "Failover Detection and Treatment in Checkpoint Systems," U.S. Appl. No. 14/067,420, Filed Oct. 30, 2013, IBM Docket No. ROC920130049US2.

REDUCING VIRTUAL MACHINE SUSPENSION TIME IN CHECKPOINT SYSTEM

TECHNICAL FIELD

This disclosure relates to checkpoint-based high availability systems. In particular, it relates to a checkpoint optimization system for more efficient virtual machine suspension.

BACKGROUND

Virtualization involves creation of an abstracted system on a hardware platform. A hypervisor creates one or more virtual machines (also known as logical partitions) on a computer system and manages resource, memory, and device allocation for the virtual machines. The hypervisor may be installed directly on the hardware or may be installed on a host operating system. Each virtual machine has abstracted components such as a processor, memory, and I/O devices, as well as an installed guest operating system.

Virtual machines often perform parallel tasks and are managed with regard to the tasks. A virtual machine may fail due to hardware failure, firmware failure, power loss, or other casualty that interrupts operation of the virtualized system. High availability is the concept of maintaining service of virtual components in the event of such a failure.

SUMMARY

The present disclosure includes a computer-implemented method for performing a checkpoint that includes determining a checkpoint boundary of the checkpoint for a virtual machine, wherein the virtual machine has a first virtual processor, determining a scheduled hypervisor interrupt for the first virtual processor, and adjusting, by operation of one or more computer processors, the scheduled hypervisor interrupt to before or substantially at the checkpoint boundary.

The present disclosure also includes a method for performing a checkpoint that includes determining a checkpoint boundary for a virtual machine, wherein the virtual machine has a first virtual processor, monitoring a first execution time for a first hypervisor call of the first virtual processor, evaluating, by operation of one or more computer processors, whether the first execution time has exceeded the next checkpoint boundary, and suspending the first hypervisor call in response to the execution time exceeding the next checkpoint boundary.

The present disclosure also includes a computer-implemented method for performing a checkpoint that includes determining a checkpoint boundary for a virtual machine, wherein the virtual machine has a first virtual processor, monitoring a first execution time for a first hypervisor call of the first virtual processor, evaluating, by operation of one or more computer processors, whether the first execution time has exceeded the checkpoint boundary, and suspending the first hypervisor call in response to the execution time exceeding the checkpoint boundary.

The present disclosure also includes a computer-implemented method for performing a checkpoint that includes monitoring an observed checkpoint rate of a virtual machine, evaluating, by operation of one or more computer processors, the observed checkpoint rate against a scheduled checkpoint rate of the virtual machine, and increasing the scheduled checkpoint rate in response to a determination that the actual checkpoint rate is greater than the scheduled checkpoint rate.

BRIEF DESCRIPTION OF THE DRAWINGS

The drawings included in the present application are incorporated into, and form part of, the specification. They illustrate embodiments of the present invention and, along with the description, serve to explain the principles of the invention. The drawings are only illustrative of typical embodiments of the invention and do not limit the invention.

DETAILED DESCRIPTION

High availability data processing systems are designed to have substantially uninterrupted performance through redundant and synchronous architecture. One method of redundancy and synchronization for high availability data processing systems involves checkpoint-based high availability. In checkpoint-based high availability, a host machine (primary host) running a virtual machine performs a checkpoint on the virtual machine at a scheduled time or event occurrence. A checkpoint is a moment in time at which the state of a partition is captured by a hypervisor and transmitted to another system. The checkpoint mirrors the virtual machine of the primary host to another virtual machine maintained on a different host machine (secondary host). By maintaining a ready copy of the virtual machine on a separate system, system control and execution can be shifted to the secondary host in the event of failure of the primary host with less interruption.

Figure 1:
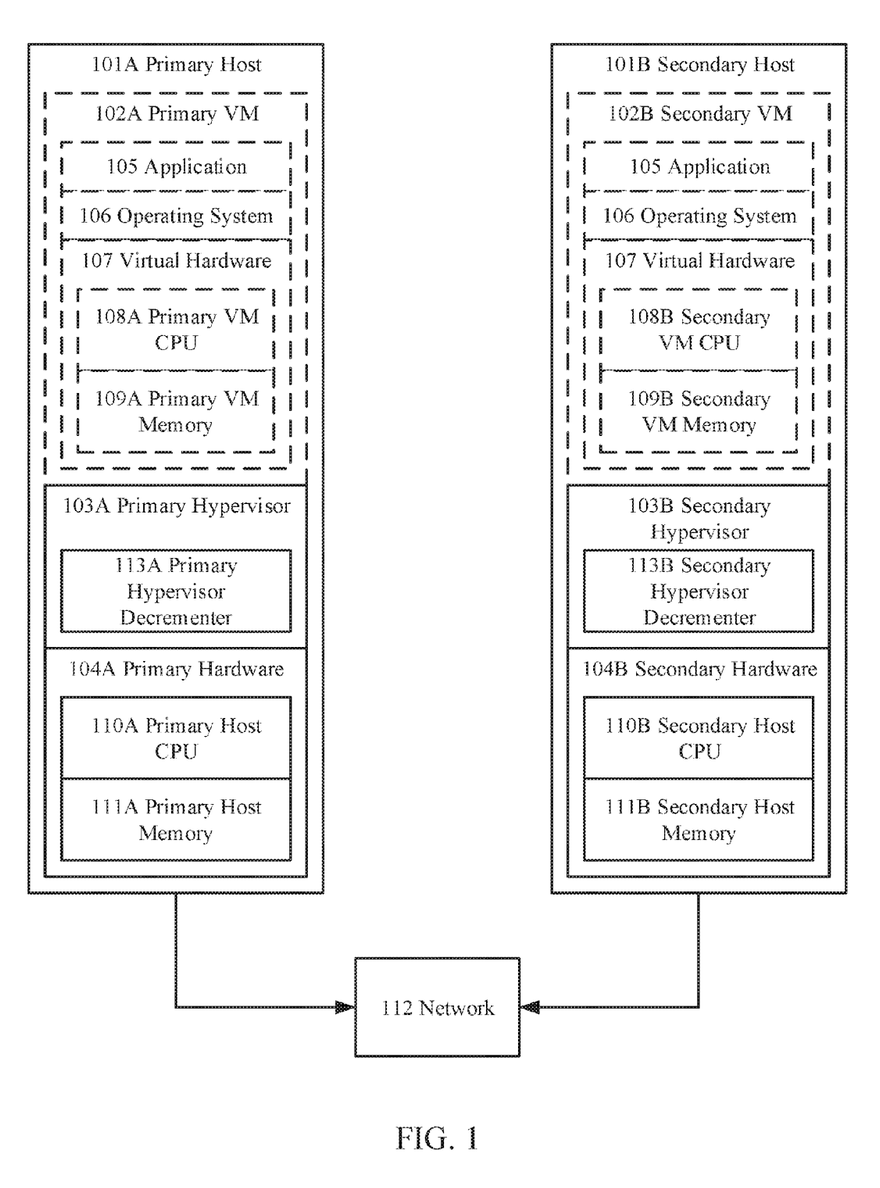
FIG. 1 is a diagram of physical and virtual aspects of a high availability checkpoint system utilizing two hosts running mirrored virtual machines, according to embodiments of the disclosure.

FIG. 1 is a diagram of physical (solid line) and virtual (dotted line) aspects of a high availability checkpoint system embodiment utilizing two hosts running mirrored virtual machines, according to embodiments of the disclosure. A primary host 101A contains a primary hypervisor 103A that abstracts a plurality of primary virtual machines 102A (only one shown for clarity) from primary hardware 104A of the primary host 101A. A secondary host 101B contains a secondary hypervisor 103B that abstracts a secondary virtual machine 102B, which is a checkpoint copy of the primary virtual machine, from secondary hardware 104B of the secondary host 101B. Each virtual machine 102 may include applications 105, an operating system 106, and virtual hardware 107. The virtual hardware 107 may include VM CPU 108 and VM memory 109 resources, abstracted from host CPU 110 and host memory 111 resources on the host system hardware 104. The primary host 101A and secondary host 101B are in communication with each other through a network 112 containing one or more communication pathways.

In operation, the checkpoint process begins with the primary host 101A generally tracking changes to CPU state and updates to memory pages, virtual I/O traffic, and partition events of the primary virtual machine 102A, and then sending those changes and updates to the secondary host 101B. Some checkpoint information, such as processor state information, can only be completed once execution of the primary virtual machine 102A has been suspended. For the primary hypervisor 103A to perform a checkpoint, long-running hypervisor calls typically must complete before the primary hypervisor 103A observes a checkpoint is pending. Once the checkpoint is pending, the primary hypervisor 103A records that the primary virtual machine 102A needs suspension and waits for all the physical processors executing the primary virtual machine 102A to observe the suspension and stop execution. Time spent waiting while performing a checkpoint decreases virtual machine performance.

According to embodiments of the invention, a hypervisor may improve system performance in a high availability checkpoint system by determining when the next checkpoint may occur and using that determination to program a hypervisor decrementer interrupt and monitor long-running hypervisor calls. In this way, the checkpoint scheduling and timing may be controlled for consistency and efficiency so that consideration of the checkpoint may be more effective for reducing the time needed for suspension of the virtual machine.

Figure 2:
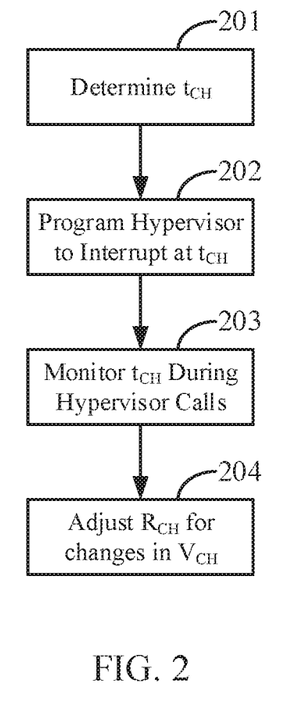
FIG. 2 is a diagram of a method to reduce virtual machine suspension time through consideration and alteration of checkpoints, according to embodiments of the disclosure.

FIG. 2 is a diagram of a method to reduce virtual machine suspension time through consideration and alteration of checkpoints, according to embodiments of the disclosure. A high availability system calculates a beginning checkpoint boundary ($t_{CH}$) of a future checkpoint, as in 201. The hypervisor may be programmed to interrupt at or near the checkpoint boundary, as in 202. The system may evaluate the checkpoint boundary during long-running hypervisor calls to determine if a checkpoint is pending, as in 203. The checkpoint rate may be monitored and adjusted to account for changes in checkpoint volume, as in 204. Each block 202, 203, and 204 may be performed independently or in alternative configurations.

Program Hypervisor Interrupt

According to embodiments of the disclosure, hypervisor interrupts for a hypervisor may be scheduled to substantially overlap with a calculated checkpoint boundary of a checkpoint. More specifically, a hypervisor's interrupt timing may be controlled by a hypervisor decrementer, which is a facility programmed to provide the hypervisor with a timed interrupt after a programmable delay. The hypervisor decrementer is a means of signaling an interrupt after a specified amount of time has elapsed. While a partition decrementer, which also provides interrupts after programmable delays, is controlled by virtual processors of a system, the hypervisor decrementer is independent of the partition decrementer, allowing the hypervisor's timing to be controlled separate from the partitions.

The hypervisor decrementer may be a decrementing counter whose period is driven by a driving frequency. Once the decrementer reaches a value of zero, an exception occurs and an interrupt is sent to the hypervisor. The timing of the hypervisor decrementer may be modified by loading a general purpose register value into the hypervisor decrementer. This new value may replace the current hypervisor decrementer value, thus changing the period of the hypervisor decrementer interrupt. Typically, in these embodiments, for software to modify the hypervisor interrupt, it may require hypervisor privilege.

Figure 3A:
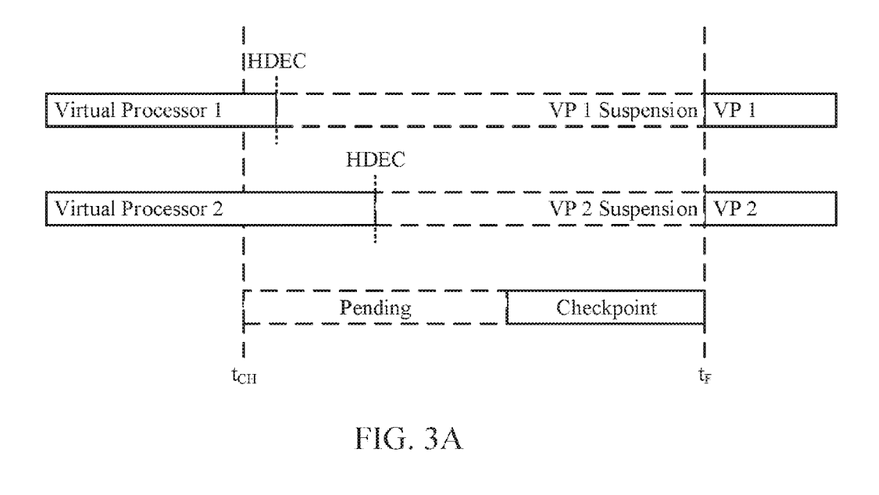
FIG. 3A is a timing diagram of hypervisor interrupt scheduling without consideration of checkpoint boundaries, according to embodiments of the disclosure.
Figure 3B:
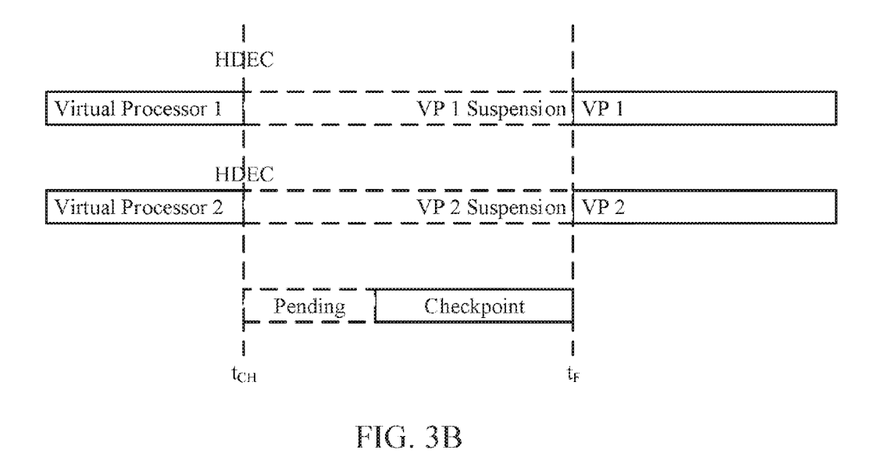
FIG. 3B is a timing diagram of hypervisor interrupt scheduling with consideration of checkpoint boundaries, according to embodiments of the disclosure.

FIG. 3A and FIG. 3B are an example set of timing diagrams of hypervisor interrupt scheduling with and without consideration of a checkpoint boundary, according to embodiments of the disclosure. In this example, the operating statuses of two virtual processors of a virtual machine and the checkpoint status of the virtual machine are shown for a checkpoint interval ($t_{CH}$ to $t_F$). To recognize a pending checkpoint, the primary hypervisor 103A must first receive a hypervisor interrupt from a hypervisor decrementer 113A, indicated in each virtual processor by HDEC. Once each virtual processor is interrupted by the HDEC, its performance is suspended. When all the virtual processors of the virtual machine are suspended, the state of the virtual processors may be captured.

In FIG. 3A, the hypervisor decrementer 113A is not scheduled with consideration to the next checkpoint boundary. The two virtual processors continue to execute after passing the scheduled checkpoint boundary until they receive an interrupt from the hypervisor decrementer 113A and recognize the checkpoint pending. By contrast, in FIG. 3B, the hypervisor decrementer 113A is programmed to correlate with the next checkpoint boundary. The hypervisor decrementer 113A interrupts each virtual processor 108 at or near the checkpoint boundary, allowing the virtual processors 108 to recognize the checkpoint so that the primary virtual machine 102A may be suspended sooner after the checkpoint boundary is pending. The virtual processors 108 may be suspended for a smaller amount of time, increasing performance.

Figure 3C:
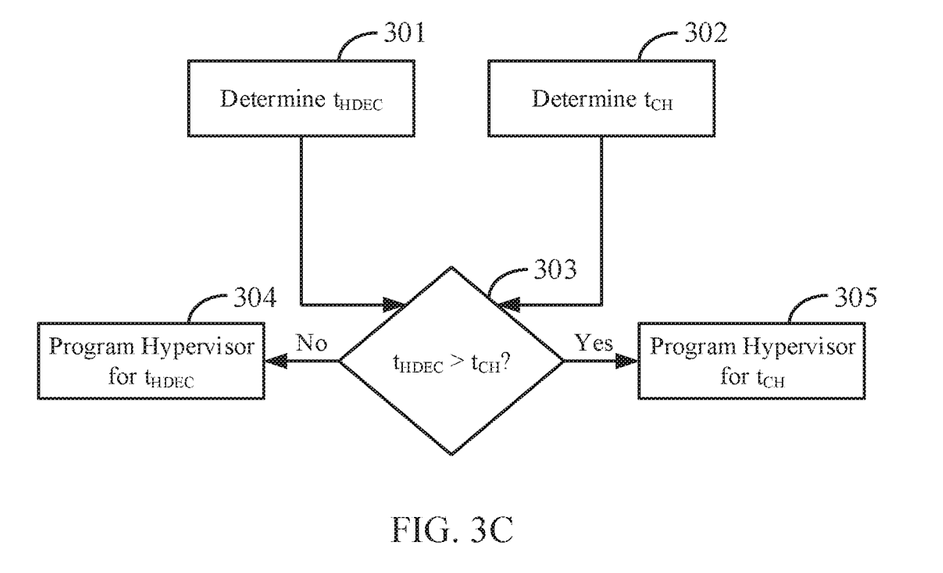
FIG. 3C is a diagram of a method for programming a hypervisor decrementer for timed interrupts to coincide with checkpoint boundaries, according to embodiments of the disclosure.

FIG. 3C is a diagram of a method for programming a primary hypervisor decrementer 113A for timed interrupts to coincide with checkpoint boundaries, according to embodiments of the disclosure. A next scheduled hypervisor interrupt ($t_{HDEC}$) is determined, as in 301, and the checkpoint boundary ($t_{CH}$) of the next checkpoint is determined, as in 302.

The next scheduled hypervisor interrupt is evaluated against the next scheduled checkpoint boundary, as in 303. If the next scheduled interrupt is set to occur before the next checkpoint boundary, the hypervisor decrementer is programmed to cause an interrupt according to its regular schedule, as in 304. If the next scheduled interrupt is set to occur after the next checkpoint boundary, the hypervisor decrementer 113A may be programmed to cause an interrupt at or near the checkpoint boundary, as in 305.

Hypervisor Call Checkpoint Monitoring

According to embodiments of the disclosure, a hypervisor call may be monitored and suspended for overlap with checkpoint boundaries. If a long-running hypervisor call is executing and a checkpoint is pending, the primary hypervisor 103A may not perform a checkpoint on the virtual machine 102 calling the hypervisor call until the hypervisor call is finished or suspended. During the hypervisor call, the primary hypervisor 103A may periodically check for whether a checkpoint is pending or scheduled and then suspend the hypervisor call. This hypervisor call suspension operation may be integrated with other hypervisor monitoring operations, such as monitoring the execution time for a long-running hypervisor call and suspending the hypervisor call if an execution threshold has been exceeded.

Figure 4A:
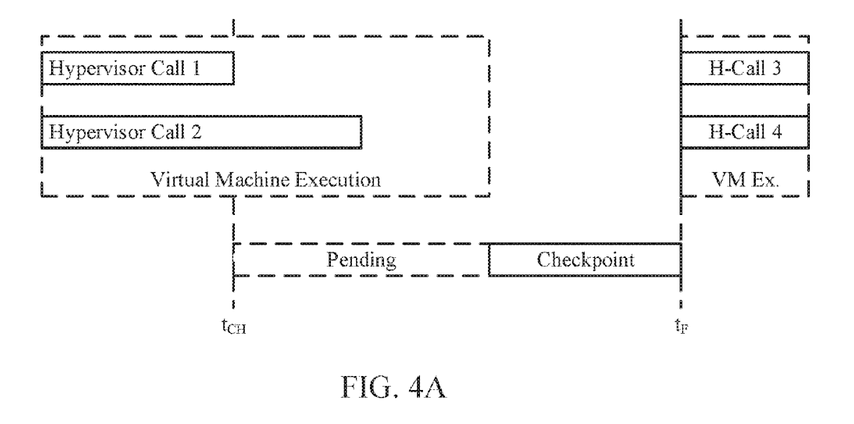
FIG. 4A is a timing diagram of hypervisor call threshold operation without consideration of checkpoint boundaries, according to embodiments of the disclosure.
Figure 4B:
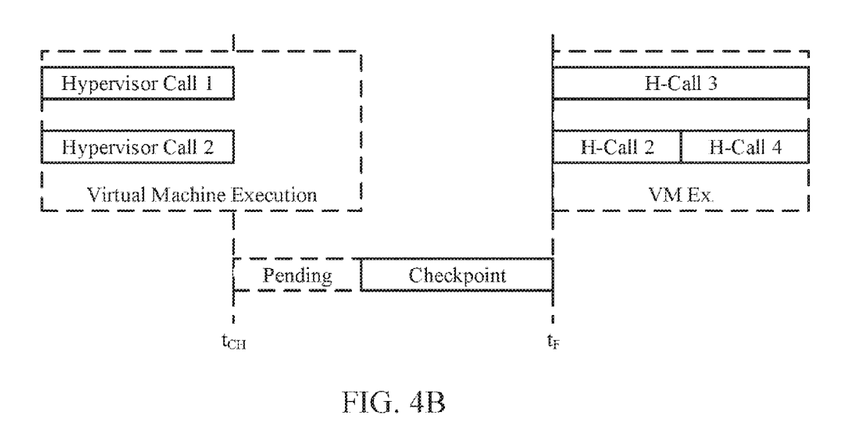
FIG. 4B is a timing diagram of hypervisor call threshold operation with consideration of checkpoint boundaries, according to embodiments of the disclosure.

FIGS. 4A and 4B are an example set of timing diagrams of hypervisor call threshold operation with and without consideration of a checkpoint boundary, according to embodiments of the disclosure. The execution of four hypervisor calls (H-Call 1, H-Call 2, H-Call 3, and H-Call 4) by a virtual machine 102 and the checkpoint status of the virtual machine 102 are shown for a checkpoint interval ($t_{CH}$ to $t_F$). For the primary hypervisor 103A to perform a scheduled checkpoint, it waits for the virtual machine 103A to complete any running hypervisor calls. Once the hypervisor calls complete, execution of the virtual machine 102 may be suspended and the state of the virtual machine 102 captured.

In FIG. 4A, the hypervisor calls are not monitored with consideration to the checkpoint boundary. The two hypervisor calls (H-Call 1 and H-Call 2) continue to run after passing the checkpoint boundary until they complete. By contrast, in FIG. 4B, the hypervisor is configured to periodically check whether a checkpoint is pending and suspend any hypervisor calls currently running. Once the checkpoint has completed, the hypervisor calls may be resumed or restarted, as shown by hypervisor calls H-Call 2, H-Call 3, and H-Call 4.

The operation to monitor whether a checkpoint is pending may be integrated with other operations for hypervisor calls. A long-running hypervisor call may be time-limited through a hypervisor time limit. The primary hypervisor 103A or checkpoint logic 603 may monitor the long-running hypervisor call for whether it has exceeded the hypervisor time limit. If the hypervisor call has exceeded the hypervisor time limit, its execution may be suspended. For example, if a long-running hypervisor call is greater than 200 microseconds, then the hypervisor call may be monitored every ten microseconds for whether its execution has exceeded a time limit. In addition to periodically monitoring the long-running hypervisor call, the primary hypervisor 103A or checkpoint logic 603 may determine whether the checkpoint is pending and suspend operation of the hypervisor call using existing suspension logic.

Figure 4C:
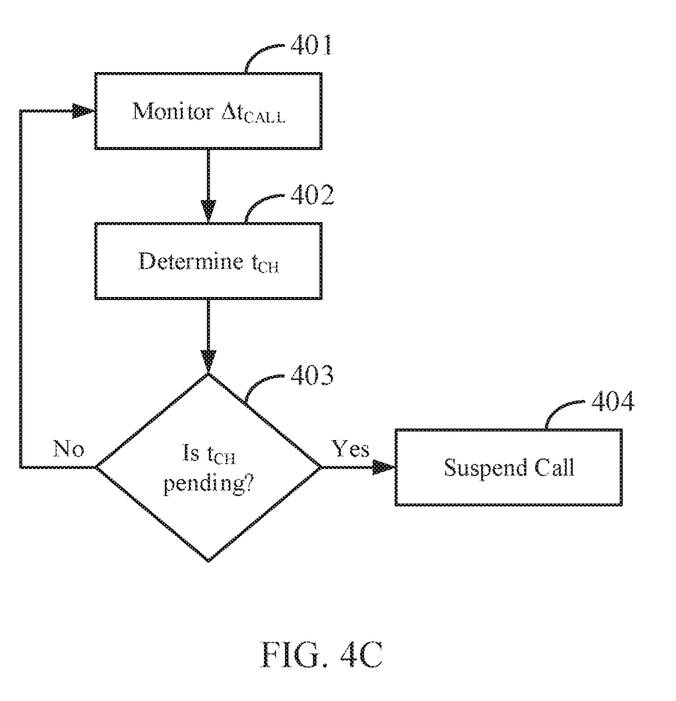
FIG. 4C is a diagram of a method for monitoring and suspending long-running hypervisor calls which overlap with a checkpoint boundary, according to embodiments of the disclosure.

FIG. 4C is a diagram of a method for monitoring and suspending long-running hypervisor calls which overlap with a checkpoint boundary, according to embodiments of the disclosure. The run-time of a hypervisor call ($t_{CALL}$) is monitored, as in 401, and the next checkpoint boundary ($t_{CH}$) is determined, as in 402. The primary hypervisor 103A evaluates whether a checkpoint is pending, as in 403. If a checkpoint is not pending, the hypervisor call continues executing and the run-time of the hypervisor call continues to be monitored, as in 402. If a checkpoint is pending, the hypervisor call is suspended so that the execution of the virtual machine 102 may be suspended for the checkpoint, as in 404.

Checkpoint Interval Management

According to embodiments of the disclosure, the rate of scheduled checkpoints may be monitored and adjusted for consistency and efficiency so that the checkpoint boundary may be appropriately considered when programming hypervisor interrupts and monitoring long-running hypervisor calls. Checkpoint methods that consider the checkpoint boundary perform best when the checkpoint boundary is predictable and follows a regular schedule controlled by the hypervisor. Due to both overhead and memory reasons, there is a finite amount of state change that a checkpoint may contain. For example, if the checkpoint data is stored in a checkpoint buffer before transmission, the volume of data may be limited to the size of the checkpoint buffer.

A checkpoint may be initiated through the system reaching a scheduled checkpoint or the system exceeding a checkpoint threshold. A checkpoint may be periodically scheduled and initiated. The period of time may be based on the volume of checkpoint information captured during a checkpoint. Alternatively, a checkpoint may be initiated by the checkpoint information exceeding a checkpoint capacity, such as the capacity of a checkpoint buffer. In that situation, a checkpoint may be automatically initiated, breaking from the checkpoint schedule. If checkpoints frequently break from schedule, suspension of the virtual machine may occur when scheduled rather than when the checkpoint is actually initiated.

Figure 5A:
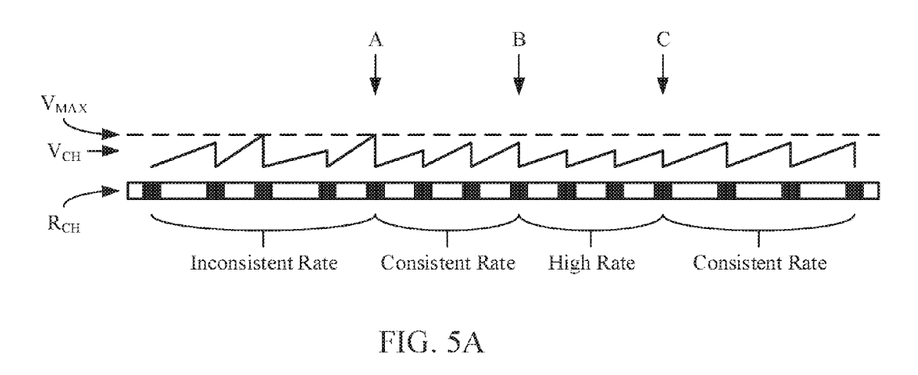
FIG. 5A is a timing diagram of checkpoint rate monitoring and feedback, according to embodiments of the disclosure.

FIG. 5A is a timing diagram of checkpoint rate monitoring and feedback, according to embodiments of the disclosure. The graph shows checkpoint rate ($R_{CH}$) with respect to the checkpoint volume ($V_{CH}$), with the dashed line representing the holding buffer's maximum checkpoint size ($V_{MAX}$) which triggers a checkpoint. Each square block and its corresponding sharp decrease in checkpoint volume indicate a checkpoint interval, though in practice the holding buffer may still contain checkpoint information after the checkpoint interval is encountered.

For the first of the four displayed checkpoint rate phases ("inconsistent rate"), the checkpoint volume is inconsistent and high for the checkpoint buffer's capacity, which causes two volume-triggered checkpoints in the first four cycles, as indicated by the checkpoint volume ($V_{CH}$) reaching the maximum checkpoint volume ($V_{MAX}$). As a result, at point A the checkpoint rate is increased, and for the next three cycles the size of each checkpoint is smaller to stay within the maximum checkpoint volume. As a result of decreasing checkpoint size, as may occur under differing system operating conditions, at point B the checkpoint size decreases, and for the next three cycles the checkpoint rate is too high for the checkpoint volume, as shown by a checkpoint volume ($V_{CH}$) that is significantly lower than the maximum checkpoint volume ($V_{MAX}$). As a result, at point C the checkpoint rate is decreased to achieve a higher volume of checkpoint information in each checkpoint and fewer checkpoints.

Figure 5B:
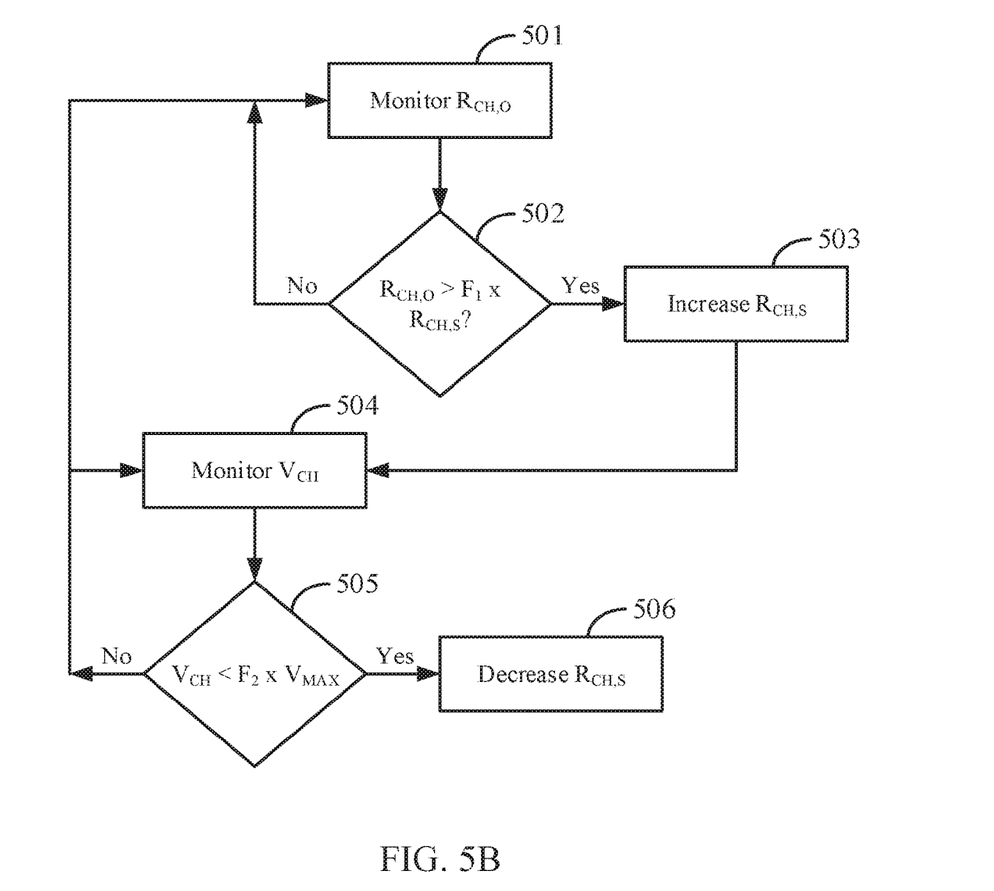
FIG. 5B is a method for altering checkpoint rate for improved timing consistency and efficiency, according to embodiments of the disclosure.

FIG. 5B is a method for altering checkpoint rate for improved timing consistency and efficiency, according to embodiments of the disclosure. The observed checkpoint rate ($R_{CH,O}$) is monitored, as in 501. The observed checkpoint rate is evaluated against the scheduled checkpoint rate ($R_{CH,S}$) to determine if the observed checkpoint rate is occurring due to checkpoint size limits being reached, as in 502. To buffer the checkpoint rate from frequent adjustments, the scheduled checkpoint rate may be multiplied by a factor ($F_1$) or gain. Additionally, the observed checkpoint rate and scheduled checkpoint rate may be averaged over a number of checkpoints. If the observed checkpoint rate is greater than the scheduled checkpoint rate, the scheduled checkpoint rate may be increased to bring the volume of checkpoint data captured in a checkpoint to an amount that can be captured in a checkpoint without exceeding the checkpoint size limit, as in 503. If the observed checkpoint rate is not greater than the scheduled checkpoint rate, the checkpoint rate may continue to be monitored, as in 501.

If the checkpoint rate has been increased, the checkpoint volume ($V_{CH}$) may be monitored, as in 504. The checkpoint volume is evaluated against a maximum checkpoint size ($V_{MAX}$), as in 505, determined by the size of the checkpoint buffer and other factors that influence the amount of data stored and transferred in each checkpoint. In order to buffer the checkpoint rate from frequent adjustments, the maximum checkpoint size may be multiplied by a factor ($F_2$) or gain. Additionally, the checkpoint volume may be averaged over a number of checkpoints. If the checkpoint volume is smaller than the maximum checkpoint size, the scheduled checkpoint rate may be decreased to bring the volume of the checkpoint data captured in a checkpoint to an amount that is closer to the maximum, as in 506. If the checkpoint volume is not smaller than the maximum checkpoint size, then both the checkpoint rate, as in 501, and the checkpoint volume, as in 504, may be monitored.

Due to the relationship between checkpoint rate and checkpoint volume, the monitoring and evaluation operations may utilize interchangeable or related variables, such as frequency of maximum volume size rather than observed checkpoint rate, to evaluate performance of the checkpoint.

Computer Implementation

Figure 6:
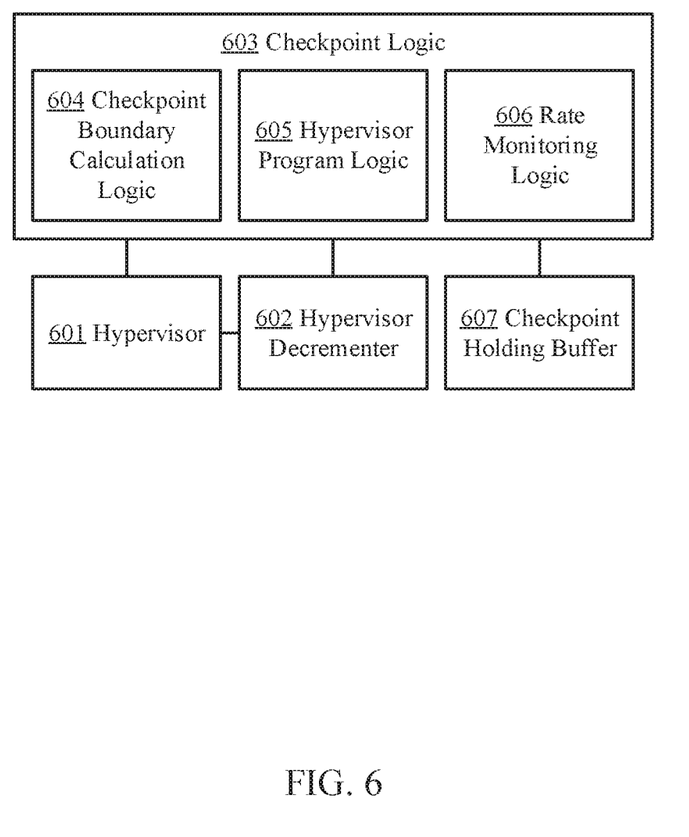
FIG. 6 is a diagram of a computer implementation for reducing virtual machine suspension time through consideration and alteration of checkpoint boundaries, according to embodiments of the disclosure.

FIG. 6 is a diagram of a computer implementation for reducing virtual machine suspension time through consideration and alteration of checkpoint boundaries, according to embodiments of the disclosure. A hypervisor 601 is sent hypervisor interrupt signals from a hypervisor decrementer 602. The hypervisor decrementer 602 may be programmed by checkpoint logic 603.

The checkpoint logic 603 may include checkpoint boundary calculation logic 604, hypervisor program logic 605, and rate monitoring logic 606. The checkpoint boundary calculation logic 604 may calculate or determine when a checkpoint is scheduled to occur. The hypervisor program logic 605 may program the hypervisor decrementer 602 so that the hypervisor 601 interrupts at or near a checkpoint boundary scheduled by the checkpoint logic 603.

The rate monitoring logic 606 may monitor an observed checkpoint rate of the virtual machine and compare the observed checkpoint rate against a scheduled checkpoint rate. The rate monitoring logic 606 may monitor the volume of the checkpoint data and compare the volume of the checkpoint data to a checkpoint data limit, which may be informed by a checkpoint holding buffer 607.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be but is not limited to, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium including, but not limited to, wireless, wire line, optical fiber cable, RF, etc., or any suitable combination of the foregoing.

Computer program code for carrying out operations for aspects of the present disclosure may be written in any combination of one or more programming languages, including an object-oriented language such as Java, Smalltalk, C++, or the like, and conventional procedural programming languages, such as "C" programming language or similar programming languages. The program code may execute entirely on the user's computer, partly on the user's computer, as a standalone software package, partly on the user's computer and partly on a remote computer or server, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other device to cause a series of operational steps to be performed on the computer, other programmable apparatus, or other device to produce a computer implemented process such that the instructions which execute on the computer or other programmable apparatus provide processes for implementing the functions/acts specified in the flowchart and/or block diagram block or blocks.

The flowcharts and block diagrams in FIG. 1, FIG. 2, FIG. 3A, FIG. 3B, FIG. 3C, FIG. 4A, FIG. 4B, FIG. 4C, FIG. 5A, FIG. 5B, and FIG. 6 illustrate the architecture, functionality, and operation of possible implementations of systems, methods, and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Although the present disclosure has been described in terms of specific embodiments, it is anticipated that alterations and modifications thereof will become apparent to those skilled in the art. Therefore, it is intended that the following claims be interpreted as covering all such alterations and modifications as fall within the true spirit and scope of the disclosure.

What is claimed is:

1. A computer program product comprising a non-transitory computer readable storage medium having program instructions embodied therewith, the program instructions executable by a processor to cause the processor to perform a method comprising:
   determining a checkpoint boundary of the checkpoint for a virtual machine, wherein the virtual machine has a virtual processor, the checkpoint boundary being a beginning point of which the checkpoint is pending;
   determining a scheduled hypervisor interrupt for the virtual processor;
   adjusting the scheduled hypervisor interrupt to occur before or at the checkpoint boundary;
   monitoring an execution time for a hypervisor call of the virtual processor;
   evaluating whether the execution time has exceeded the checkpoint boundary; and
   suspending the hypervisor call in response to the execution time exceeding the checkpoint boundary.

2. The computer program product of claim 1, wherein adjusting the scheduled hypervisor interrupt comprises programming a hypervisor decrementer to interrupt a hypervisor.

3. The computer program product of claim 2, wherein:
   before adjusting the scheduled hypervisor interrupt, the scheduled hypervisor interrupt is scheduled to occur before the checkpoint boundary; and
   the hypervisor decrementer is programmed for the scheduled hypervisor interrupt.

4. The computer program product of claim 2, wherein:
   before adjusting the scheduled hypervisor interrupt, the scheduled hypervisor interrupt is scheduled to occur after the checkpoint boundary, and
   the hypervisor decrementer is programmed for the checkpoint boundary.

5. The computer program product of claim 1, wherein the method performed by the processor further comprises:
   determining an observed checkpoint volume of the virtual machine, wherein the observed checkpoint volume is a function of a scheduled checkpoint rate;
   evaluating the observed checkpoint volume against a maximum checkpoint volume; and
   decreasing the scheduled checkpoint rate in response to a determination that the observed checkpoint volume is smaller than the maximum checkpoint volume.

6. A computer program product comprising a non-transitory computer readable storage medium having program instructions embodied therewith, the program instructions executable by a processor to cause the processor to perform a method comprising:
   determining a checkpoint boundary for a virtual machine, wherein the virtual machine has a virtual processor, the checkpoint boundary being a beginning point of which the checkpoint is pending;
   determining a scheduled hypervisor interrupt for the virtual processor;
   adjusting the scheduled hypervisor interrupt to occur before or at the checkpoint boundary;
   monitoring an execution time for a hypervisor call of the virtual processor;
   evaluating whether the execution time has exceeded the checkpoint boundary or a threshold execution time; and
   suspending the hypervisor call in response to the execution time exceeding the checkpoint boundary or the threshold execution time.

7. The computer program product of claim 6, wherein the method performed by the processor further comprises:
   monitoring an observed checkpoint rate of the virtual machine;
   evaluating the observed checkpoint rate against a scheduled checkpoint rate of the virtual machine; and
   increasing the scheduled checkpoint rate in response to a determination that the observed checkpoint rate is greater than the scheduled checkpoint rate.

8. The computer program product of claim 6, wherein the method performed by the processor further comprises:
   monitoring an observed checkpoint size of the virtual machine, wherein the observed checkpoint size is a function of a scheduled checkpoint rate;
   evaluating the observed checkpoint size against a maximum checkpoint size; and
   decreasing the scheduled checkpoint rate in response to a determination that the observed checkpoint size is smaller than the maximum checkpoint size.

9. A computer program product comprising a non-transitory computer readable storage medium having program instructions embodied therewith, the program instructions executable by a processor to cause the processor to perform a method comprising:

determining a checkpoint boundary of the checkpoint for a virtual machine, wherein the virtual machine has a virtual processor, the checkpoint boundary being a beginning point of which the checkpoint is pending;

determining a scheduled hypervisor interrupt for the virtual processor;

adjusting the scheduled hypervisor interrupt to occur before or at the checkpoint boundary;

monitoring an observed checkpoint rate of a virtual machine;

evaluating the observed checkpoint rate against a scheduled checkpoint rate of the virtual machine;

increasing the scheduled checkpoint rate in response to a determination that the observed checkpoint rate is greater than the scheduled checkpoint rate;

monitoring an execution time for a hypervisor call of the virtual processor;

evaluating whether the execution time has exceeded the checkpoint boundary; and     suspending the hypervisor call in response to the execution time exceeding the checkpoint boundary.

10. The computer program product of claim 9, wherein the method performed by the processor further comprises:

monitoring an observed checkpoint size of the virtual machine, wherein the observed checkpoint size is a function of the scheduled checkpoint rate;

evaluating the observed checkpoint size against a maximum checkpoint size; and     decreasing the scheduled checkpoint rate in response to a determination that the observed checkpoint size is smaller than the maximum checkpoint size.

11. The computer program product of claim 10, wherein the maximum checkpoint size is correlated with a checkpoint buffer volume for a host on which the virtual machine is executing.

12. The computer program product of claim 9, wherein scheduling a checkpoint hypervisor interrupt comprises programming a hypervisor decrementer to interrupt the hypervisor.

13. The computer program product of claim 12, wherein:

the scheduled hypervisor interrupt is scheduled to occur before the checkpoint boundary before adjustment; and     the hypervisor decrementer is programmed for the scheduled hypervisor interrupt.

14. The computer program product of claim 12, wherein:

the scheduled hypervisor interrupt is scheduled to occur after the checkpoint boundary before adjustment, and     the hypervisor decrementer is programmed for the checkpoint boundary.

\* \* \* \* \*